US009834150B1

(12) United States Patent
Song

(10) Patent No.: US 9,834,150 B1
(45) Date of Patent: Dec. 5, 2017

(54) PORTABLE DEVICE HOLDER FOR VEHICLE CD-SLOT MOUNTING

(71) Applicant: Soon Young Song, Anyang-si (KR)

(72) Inventor: Soon Young Song, Anyang-si (KR)

(*) Notice: Subject to any disclaimer, the term of this patent is extended or adjusted under 35 U.S.C. 154(b) by 0 days.

(21) Appl. No.: 15/493,137

(22) Filed: Apr. 21, 2017

(30) Foreign Application Priority Data

Nov. 18, 2016 (KR) ........................ 10-2016-0154281

(51) Int. Cl.
| | | |
|---|---|---|
| *B60R 7/06* | (2006.01) | |
| *B60R 11/02* | (2006.01) | |
| *B60R 11/00* | (2006.01) | |

(52) U.S. Cl.
CPC ................ *B60R 7/06* (2013.01); *B60R 11/02* (2013.01); *B60R 11/0241* (2013.01); *B60R 11/0252* (2013.01); *B60R 2011/0005* (2013.01); *B60R 2011/005* (2013.01); *B60R 2011/0059* (2013.01)

(58) Field of Classification Search
CPC . B60R 11/02; B60R 11/0241; B60R 11/0252; B60R 2011/0059; B60R 2011/0005
See application file for complete search history.

(56) References Cited

U.S. PATENT DOCUMENTS

| | | | |
|---|---|---|---|
| 8,505,795 B2 * | 8/2013 | Dunn | B60R 11/00 224/545 |
| D716,215 S * | 10/2014 | Dunn | D12/415 |
| D767,556 S * | 9/2016 | Lee | D12/415 |
| 9,505,355 B1 * | 11/2016 | Cho | B60R 11/0241 |
| D780,169 S * | 2/2017 | Du | D14/253 |
| 2008/0190978 A1 * | 8/2008 | Brassard | B60R 11/02 224/483 |
| 2014/0138418 A1 * | 5/2014 | Dunn | B60R 11/02 224/483 |
| 2016/0288730 A1 * | 10/2016 | Lee | B60R 11/02 |

FOREIGN PATENT DOCUMENTS

| | | | | |
|---|---|---|---|---|
| GB | 2479827 A | * | 10/2011 | ............ B60R 11/02 |
| KR | 10-1447088 B1 | | 10/2014 | |
| WO | WO 2015085310 A1 | * | 6/2015 | ............ B60R 11/02 |

* cited by examiner

*Primary Examiner* — Justin Larson
(74) *Attorney, Agent, or Firm* — Revolution IP, PLLC

(57) ABSTRACT

Disclosed is a portable device holder for vehicle CD-slot mounting, and more particularly to a portable device holder for vehicle CD-slot mounting, in which a facing distance between a movable piece and a stationary piece to be inserted in a CD slot of a vehicle becomes shorter when external forces act thereon, and the facing distance between the movable piece and the stationary piece to be inserted in the CD slot of the vehicle becomes longer when no external forces act thereon, thereby being easily inserted in and mounted to the CD slot of the vehicle and keeping a stable and secured mounting state.

3 Claims, 7 Drawing Sheets

[Fig. 1]
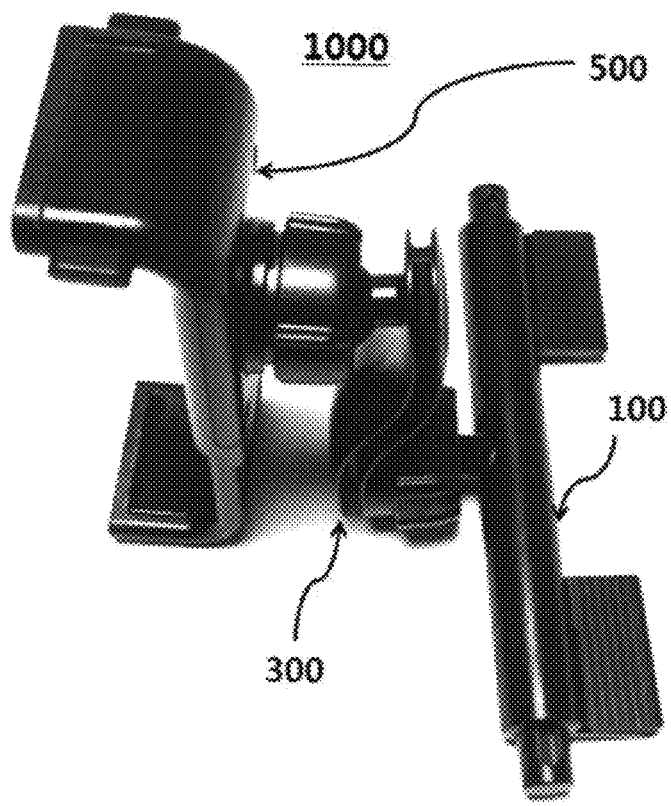
[Fig. 2]
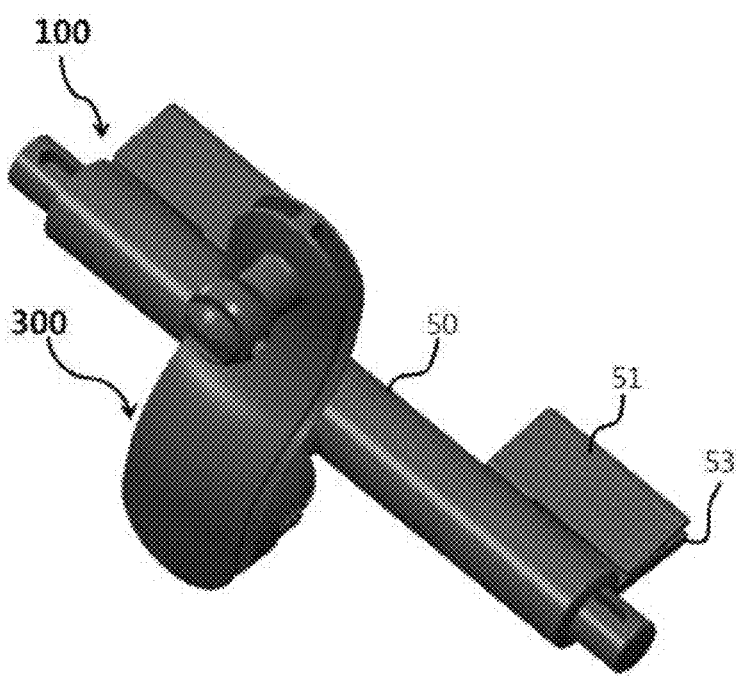

[Fig. 3]
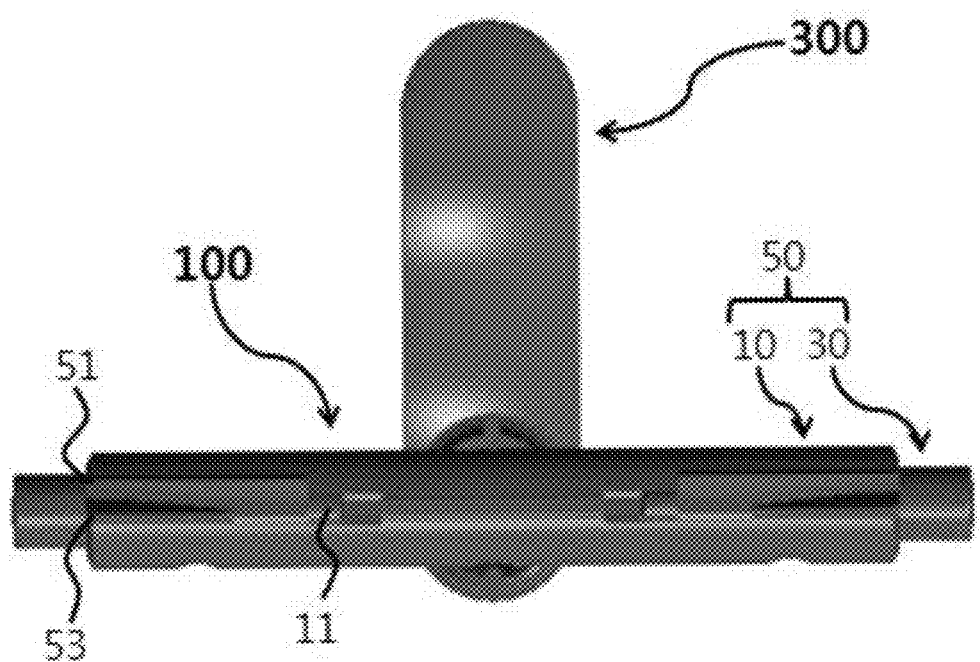
[Fig. 4]
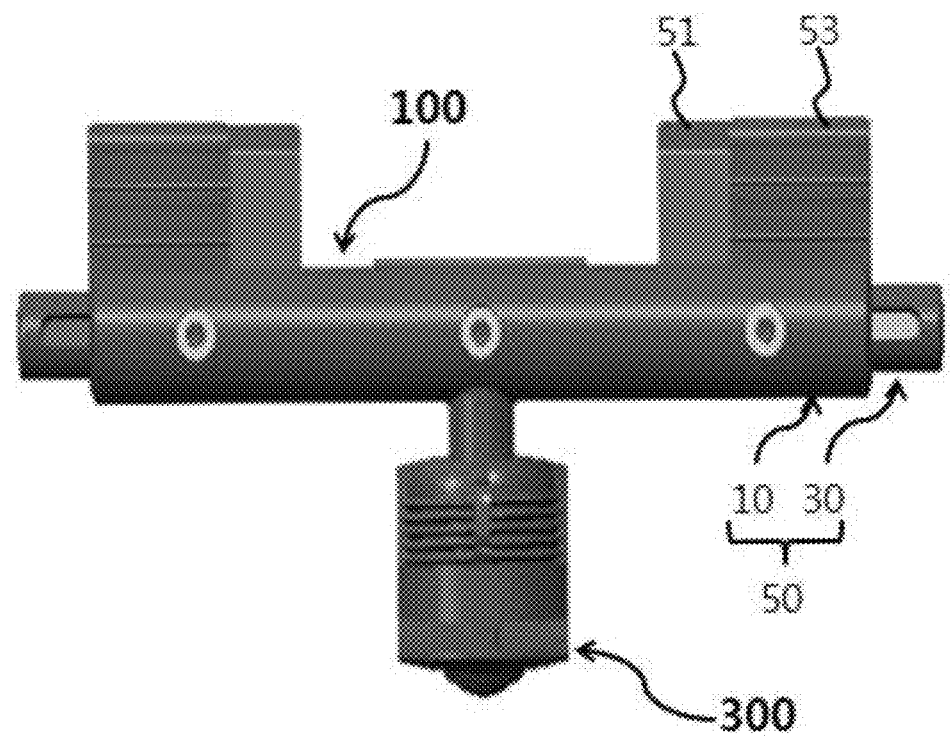

[Fig. 9]
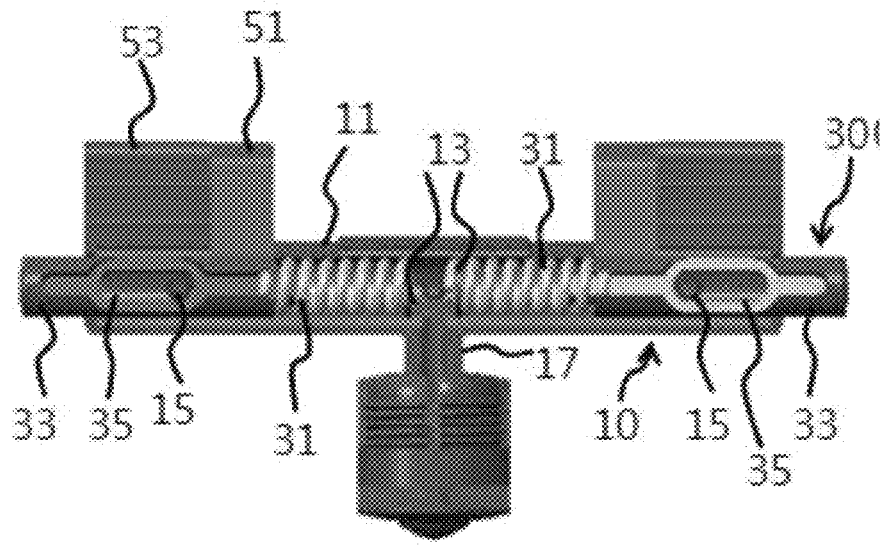
[Fig. 10]
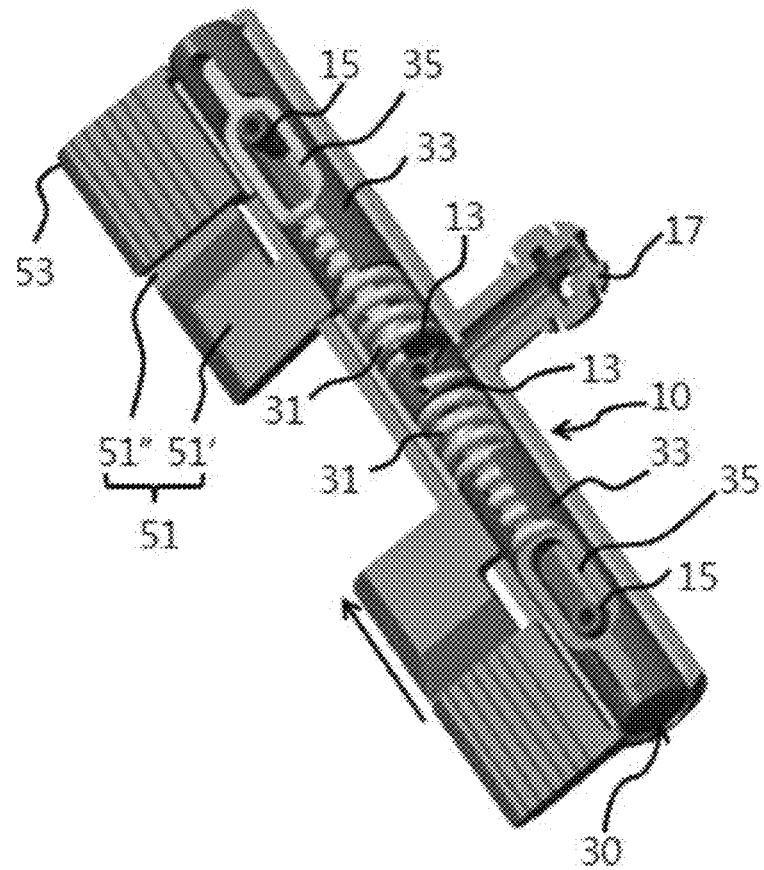

[Fig. 11]
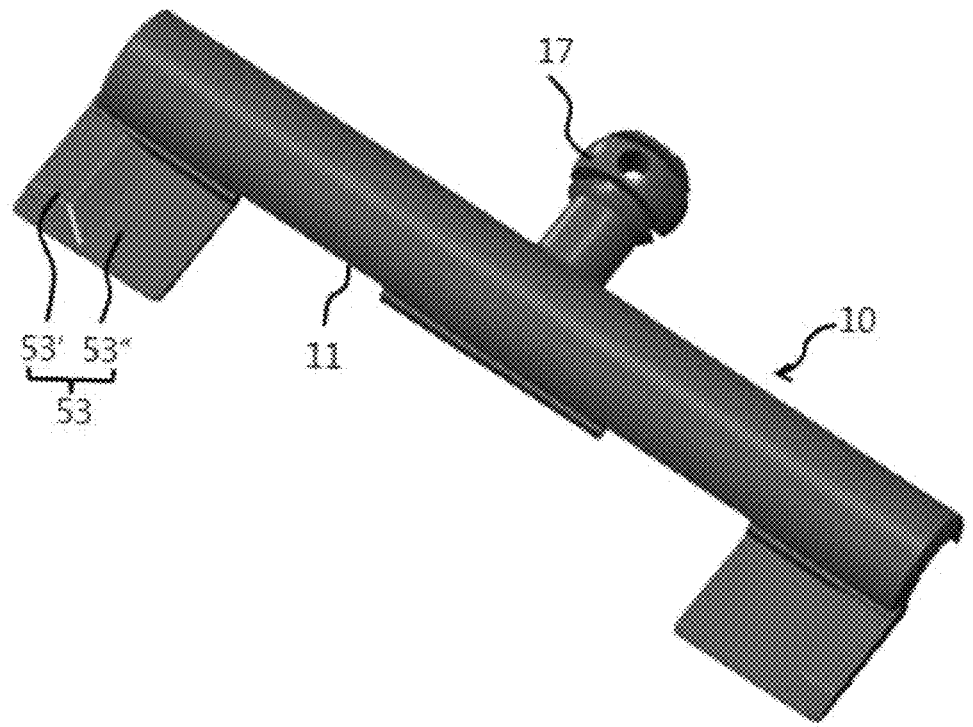
[Fig. 12]
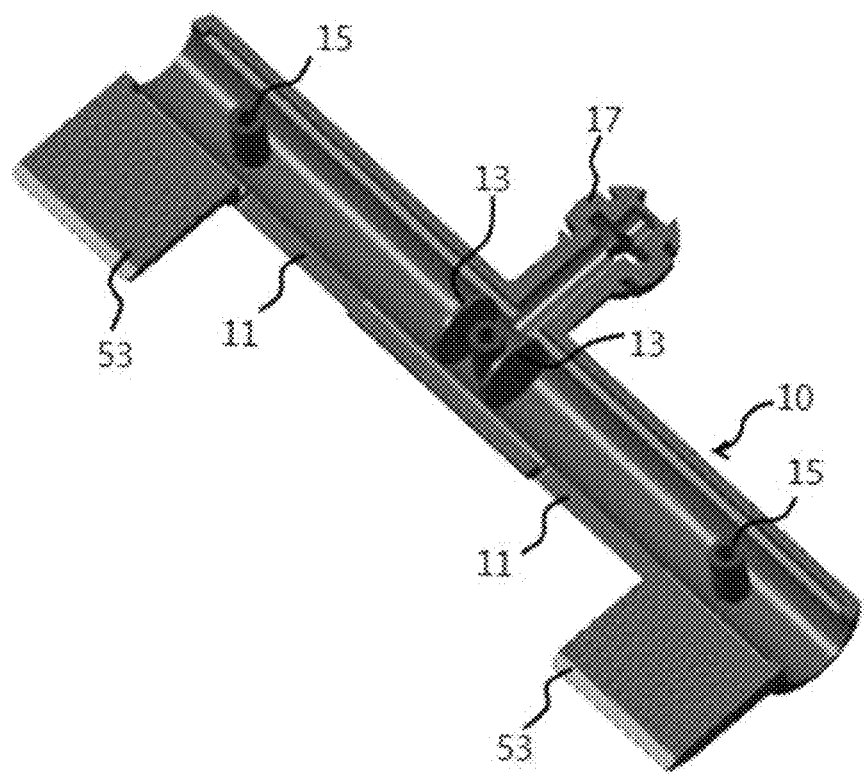

[Fig. 13]
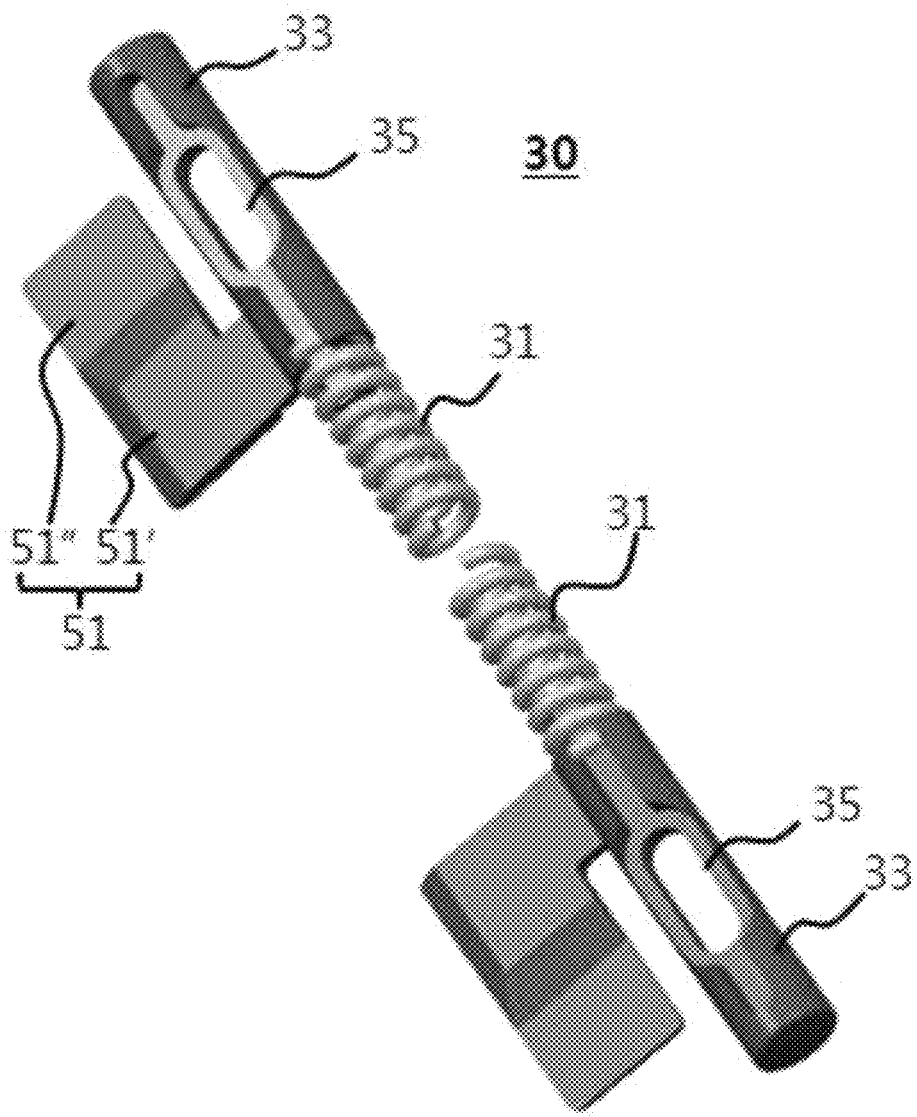

PORTABLE DEVICE HOLDER FOR VEHICLE CD-SLOT MOUNTING

CROSS-REFERENCE TO RELATED APPLICATION

This application claims priority from Korean Patent Application No. 10-2016-0154281, filed on Nov. 18, 2016 in the Korean Intellectual Property Office, the disclosure of which is incorporated herein by reference.

BACKGROUND

Field of the Invention

The present invention relates to a portable device holder for vehicle compact disc (CD)-slot mounting, which can be easily inserted in and mounted to a vehicle CD slot and keep its mounting state stably and securely.

Description of the Related Art

A portable device may be not only carried but also stationarily installed inside a vehicle when in use. To stationarily hold the portable device, there has recently been proposed a holder that is inserted in and mounted to a vehicle CD-slot.

As a related art, Korean Patent No. 10-1447088 has disclosed a portable terminal cradle for vehicles, which employs a CD slot provided at one side of a driver seat to stably support/hold a portable terminal and is easily detachable and attachable.

However, the related art discloses a single insertion plate to be inserted into the CD slot and thus the insertion plate is not variable in thickness inside the CD slot. Therefore, the portable terminal cradle of the related art is not smoothly inserted into the CD slot and is unstable in the inserted state. In other words, the related art is restrictively applicable to only a CD slot which tapers at opposite ends. In case of a uniform CD slot, the portable terminal cradle of the related art is not easily inserted therein and not securely and stably kept even after the insertion.

Further, the related art is not universally applicable to CD slots of various sizes, but applicable only a designated CD slot.

SUMMARY

Accordingly, the present invention is conceived to solve the foregoing problems, and an object of the present invention is to provide a portable device holder for vehicle CD-slot mounting, which can be easily inserted in and mounted to a vehicle CD slot and keep its mounting state stably and securely.

Another object of the present invention is to provide a portable device holder for vehicle CD-slot mounting, which can be mounted to CD slots of various sizes and be thus improved in universality.

In accordance with an embodiment of the present invention, there is provided a portable device holder for vehicle CD-slot mounting comprising a mounting module which comprises a movable piece and a stationary piece facing each other to be inserted in and mounted to a CD slot of a vehicle; a cradle on which a portable device is rest and held; and a connection module which connects the mounting module and the cradle, wherein the mounting module comprises a body shaped like a bar connected to the connection module, and the movable piece and the stationary piece protruding from an outer circumference of the body, wherein the movable piece is movable in a lengthwise direction of the body when external forces acts thereon and returns to its original position when the external forces are removed, wherein a facing distance between the movable piece and the stationary piece of when the external forces act thereon is shorter than the facing distance between the movable piece and the stationary piece of when no external forces act thereon.

The body may comprise a stationary body which is shaped like a hollow bar and comprises the stationary piece protruding from an outer circumference thereof, and a slit adjacent to the stationary piece and formed in a lengthwise direction; and a movable body which is inserted in and coupled to a hollow of the stationary body and connects with the movable piece protruding from an outer circumference thereof through the slit so that the movable piece can slide along the slit when external forces act thereon and return to the original position by elasticity of an elastic body when the external forces are removed.

A surface, which faces the stationary piece, between both surfaces of the movable piece may comprise a movable high portion, and a movable low portion lower than the movable high portion, and the movable high portion may be adjacent to the slit.

BRIEF DESCRIPTION OF THE DRAWINGS

The above and/or other aspects of the present invention will become apparent and more readily appreciated from the following description of the exemplary embodiments, taken in conjunction with the accompanying drawings, in which:

FIG. 1 is a perspective view of a portable device holder for vehicle CD-slot mounting according to an embodiment of the present invention.

FIG. 2 is a partial perspective view of the portable device holder for vehicle CD-slot mounting according to an embodiment of the present invention.

FIG. 3 is a partial front view of the portable device holder for vehicle CD-slot mounting according to an embodiment of the present invention.

FIG. 4 is a partial bottom view of the portable device holder for vehicle CD-slot mounting according to an embodiment of the present invention.

FIG. 9 is an open bottom view of the portable device holder for vehicle CD-slot mounting according to an embodiment of the present invention when no external forces act thereon.

FIG. 10 is an open perspective view from the bottom of the portable device holder for vehicle CD-slot mounting according to an embodiment of the present invention when external forces act thereon.

FIG. 11 is a perspective view from the top of a stationary body in the portable device holder for vehicle CD-slot mounting according to an embodiment of the present invention].

FIG. 12 is a perspective view from the bottom of the stationary body in the portable device holder for vehicle CD-slot mounting according to an embodiment of the present invention.

FIG. 13 is a perspective view from the bottom of a movable body in the portable device holder for vehicle CD-slot mounting according to an embodiment of the present invention.

DETAILED DESCRIPTION

Below, embodiments of the portable device holder for vehicle CD-slot mounting according to the present invention will be described in detail with reference to accompanying drawings.

Terms or words used in the following embodiments shall be construed as not typical or lexical limited meaning but conceptual meaning adapted to the technical idea of the present invention on the principle that the inventor can properly define a concept of a term to optimally explain his/her own invention.

According to an embodiment of the present invention, a portable device holder 1000 is inserted in and mounted to a compact disc (CD) slot provided in a vehicle, and therefore stably and securely supports various portable devices.

Referring to FIG. 1 to FIG. 4, the portable device holder 1000 for vehicle CD-slot mounting according to an embodiment of the present invention includes a mounting module 100 which is inserted in and mounted to the CD slot, a cradle 500 on which the portable device is rest and held, and a connection module 300 which connects the mounting module 100 and the cradle 500.

The cradle 500 may have various structures and methods as long as it can securely hold a portable device. That is, the cradle 500 of various structures and methods may be selectively applied so long as it is connected to one end of the connection module 300, facilitates a support of a portable device, stably clamps the rested portable device, and releases the portable device.

The connection module 300 may have various structures and methods as long as it can connect the mounting module 100 and the cradle 500. That is, the connection module 300 may be variously configured so long as it has a first end connected to the cradle 500 and a second end connected to the mounting module 100.

Figure 5:
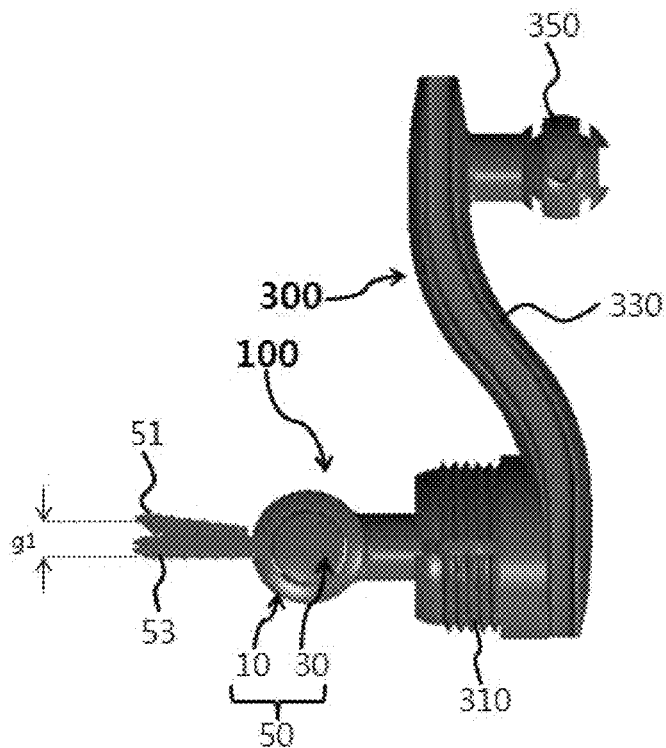
FIG. 5 is a lateral view of the portable device holder for vehicle CD-slot mounting according to an embodiment of the present invention when no external forces act thereon.
Figure 6:
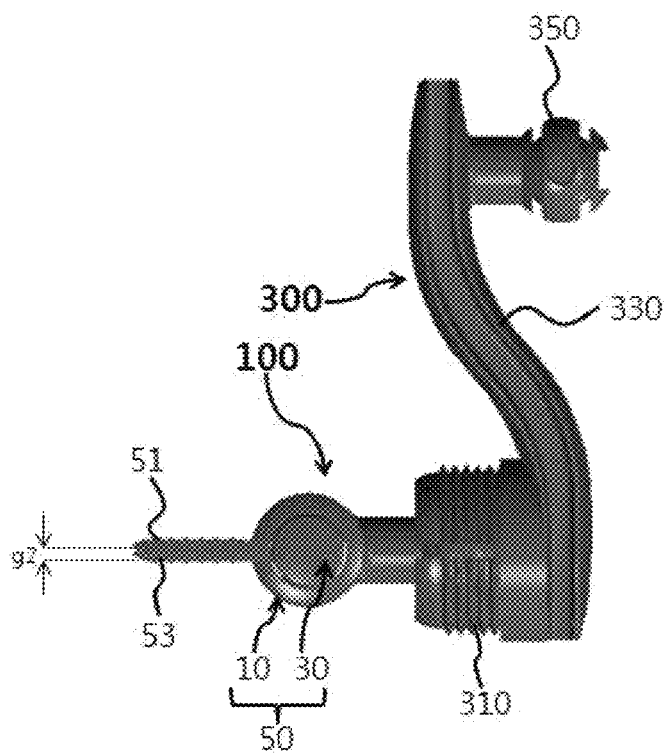
FIG. 6 is a lateral view of the portable device holder for vehicle CD-slot mounting according to an embodiment of the present invention when external forces act thereon.
Figure 7:
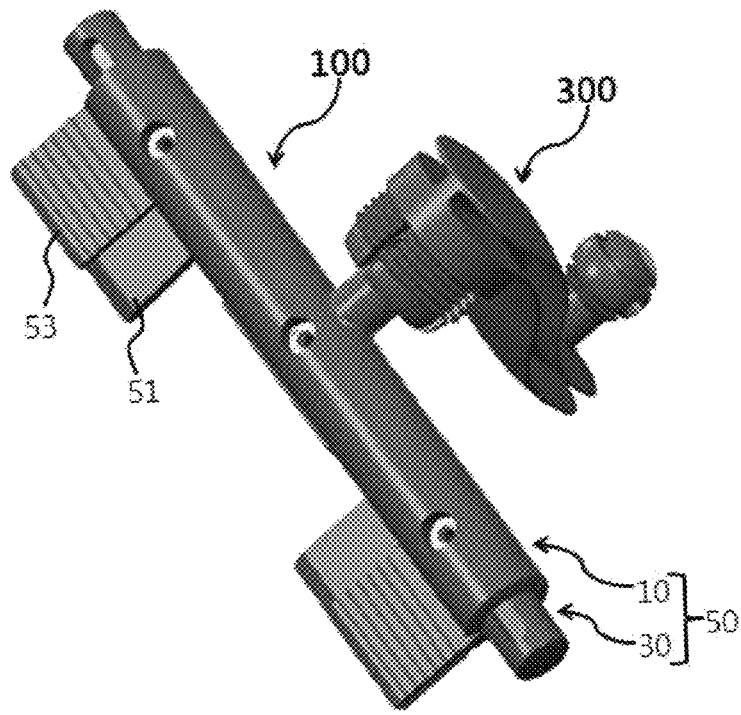
FIG. 7 is a perspective view from the bottom of the portable device holder for vehicle CD-slot mounting according to an embodiment of the present invention when no external forces act thereon.

Specifically, the connection module 300 according to an exemplary embodiment of the present invention includes a first fastening portion 310, an extended portion 330 and a second fastening portion 350 as shown in FIG. 5 and FIG. 6. Here, FIG. 5 is a lateral view of the portable device holder 1000 for vehicle CD-slot mounting according to an embodiment of the present invention when no external forces act thereon, and FIG. 6 is a lateral view of the portable device holder 1000 for vehicle CD-slot mounting according to an embodiment of the present invention when external forces act thereon. The external forces refer to forces applied by a user so as to move a movable piece 51 between the movable piece 51 and a stationary piece 53 that constitute the portable device holder for vehicle CD-slot mounting, and this will be described later.

The first fastening portion 310 of the connection module 300 is connected to a predetermined portion of the mounting module 100, i.e. a connecting portion 17 of a stationary body 10 as shown in FIG. 9 to FIG. 13. Specifically, the connecting portion 17 of the stationary body 10 is formed with an insertion ball at an end thereof, and the first fastening portion 310 has a structure for accommodating the insertion ball. Therefore, the first fastening portion 310 is connected to the connecting portion 17 of the stationary body 10 and rotated at various angles.

The first fastening portion 310 is connected to a first end of the extended portion 330, and the second fastening portion 350 is connected to a second end of the extended portion 330. Specifically, the first fastening portion 310 is formed to protrude from the first end of the extended portion 330 in a first direction, and the second fastening portion 350 is formed to protrude from the second end of the extended portion 330 in a second direction (or an opposite direction to the first direction).

The second fastening portion 350 connects with the cradle 500. The cradle 500 also needs to have a structure for rotating at various angles. Therefore, the second fastening portion 350 is formed with an insertion ball at an end thereof, and the cradle 500 has a structure for accommodating the insertion ball and rotating in various directions.

Like this, the extended portion 330 includes the first fastening portion 310 at the first end thereof to which the mounting module 100 is fastened, and the second fastening portion 350 at the second end thereof to which the cradle 500 is fastened. The extended portion 330 may have various shapes. For example, the extended portion 330 may have a straight shape, a curved shape, etc.

According to an embodiment of the present invention, the extended portion 330 may be curved in the protruding direction of the first fastening portion 310 from the first end connecting with the first fastening portion 310 to the second end connecting with the second fastening portion 350. Thus, the second end of the extended portion 330 is aligned with not the first end but the protruding portion of the first fastening portion 310.

As compared with the straight shape of the extended portion, such a curved shape of the extended portion 330 decreases the loads of the movable piece 51 and the stationary piece 53 inserted in the CD slot while a portable device is mounted to the cradle 500 connecting with the second fastening portion 350. In result, the curved shape of the extended portion 330 applies less stress to the CD slot than the straight shape of the extended portion, and thus minimizes damage of the CD slot, thereby improving stability of the portable device holder for vehicle CD-slot mounting according to an embodiment of the present invention when it is mounted to the CD slot.

According to an embodiment of the present invention, a plurality of connection modules 300 may be coupled to each other for connection between the mounting module 100 and the cradle 500. In this case, if the extended portion 330 has a straight shape, the second end of the uppermost connection module gets closer to a driver (in a rightward direction of FIG. 5) when the plurality of connection modules 300 are coupled to each other. Then, the cradle 500 connected to the second fastening portion 350 of the uppermost connection module is so close to a driver that the portable device holder will lose its function.

On the other hand, in the case where the extended portion 330 is curved as described above in a direction opposite to a driver (i.e. in a leftward direction of FIG. 5) from the first end to the second end, if the plurality of connection modules 300 are coupled to each other, it becomes longer vertically without getting closer to the driver and does not disturb the driver. Accordingly, the extended portion 330 according to an exemplary embodiment of the present invention is curved in the protruding direction of the first fastening portion 310 from the first end connecting with the first fastening portion 310 to the second end connecting with the second fastening portion 350.

According to an embodiment of the present invention, the portable device holder for vehicle CD-slot mounting is inserted in and stably mounted to the CD slot of the vehicle. To this end, the mounting module 100 is employed. As shown in FIG. 5 to FIG. 10, the mounting module 100 includes the movable piece 51 and the stationary piece 53, which face each other, to be inserted in and mounted to the CD slot. In other words, the mounting module 100 is mounted to the CD slot of the vehicle as the movable piece 51 and the stationary piece 53 facing each other are inserted in the CD slot.

As shown in FIG. 2 to FIG. 8, the mounting module 100 includes a body 50 shaped like a bar to be connected to the connection module 300, and the movable piece 51 and the stationary piece 53 protruding from an outer circumference of the body 50 and facing each other.

The body 50 is generally shaped like a long bar, and connects with the connection module 300 at the middle thereof. Specifically, the stationary body 10 of the body 50 is formed with the connecting portion 17, and the connecting portion 17 is coupled to the first fastening portion 310 of the connection module 300.

The movable piece 51 and the stationary piece 53 protrude from the outer circumference of the body 50, and face each other. According to an exemplary embodiment, the portable device holder for vehicle CD-slot mounting is stably mounted since the movable piece 51 and the stationary piece 53 are inserted in the CD slot.

According to an embodiment of the present invention, the movable piece 51 and the stationary piece 53 are arranged to face each other with a variable facing space or distance between them. Specifically, the facing distance between the movable piece 51 and the stationary piece 53 becomes shorter (i.e. the facing space between them is narrower than the CD slot) when a user mounts the portable device holder for vehicle CD-slot mounting to the CD slot, and the facing distance between the movable piece 51 and the stationary piece 53 becomes longer after the movable piece 51 and the stationary piece 53 are inserted in the CD slot. In result, the movable piece 51 and the stationary piece 53 are securely kept without any gap as they are inserted in the CD slot.

Figure 8:
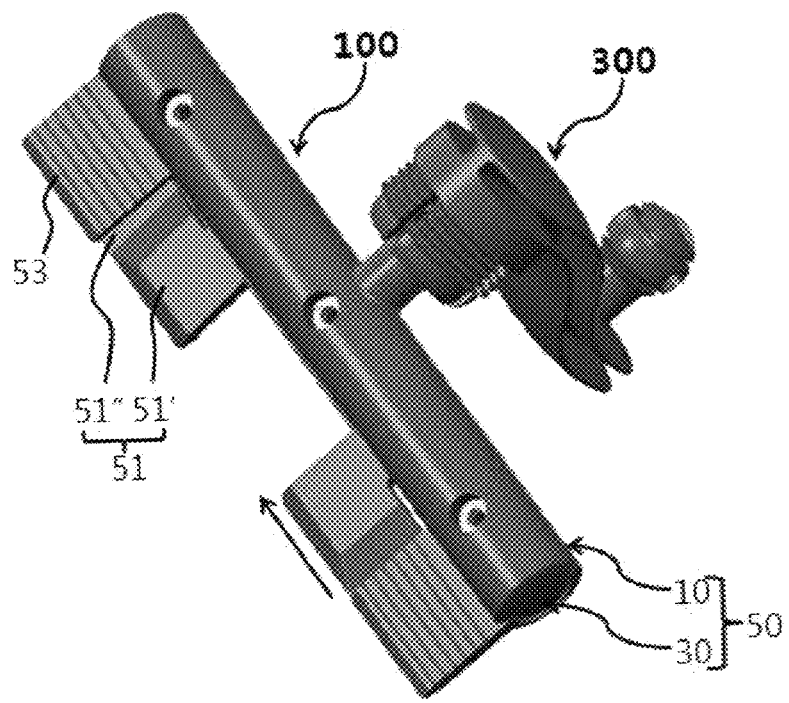
FIG. 8 is a perspective view from the bottom of the portable device holder for vehicle CD-slot mounting according to an embodiment of the present invention when external forces act thereon.

In more detail, the movable piece 51 is movable in a lengthwise direction of the body 50 as shown in FIG. 8 and FIG. 10 when external forces act thereon, and returns to its original position when no external forces act thereon. Referring to FIG. 5 and FIG. 6, a facing distance g2 from the movable piece 51 to the stationary piece 53 when external forces acts thereon (see FIG. 6) is shorter than a facing distance g1 from the movable piece 51 to the stationary piece 53 when no external forces acts thereon (see FIG. 5)

The movable piece 51 is movable along the longitudinal direction of the body 50 while facing the stationary piece 53. Specifically, the movable piece 51 and the stationary piece 53 are respectively provided at each of opposite sides of the body 50, and the movable piece 51 and the stationary piece 53 are arranged to face each other at each side. Further, the movable piece 51 is movable toward the middle of the body 50, and then returns to its original position.

Each movable piece 51 moves toward the middle of the body 50 when a user's external forces act thereon, and returns to its original position when no external forces act thereon. In other words, the movable piece 51 is movable in the lengthwise direction of the body 50 when external forces act thereon, and returns along the lengthwise direction of the body 50 when no external forces act thereon.

According to an embodiment of the present invention, the facing distance between the movable piece 51 and the stationary piece 53 is variable while the movable piece 51 is moving. For example, when the movable piece 51 moves toward the middle of the body 50 by external forces, the facing space, i.e. the facing distance between the movable piece 51 and the stationary piece 53 decreases (see FIG. 6, FIG. 8 and FIG. 10). On the other hand, when the external forces are removed, the movable piece 51 automatically returns and thus the facing space, i.e. the facing distance between the movable piece 51 and the stationary piece 53 increases (see FIG. 5, FIG. 7 and FIG. 9).

To make the facing distance between the movable piece 51 and the stationary piece 53 shorter as the movable piece 51 moves toward the middle of the body 50 by external forces, and longer as the movable piece 51 automatically returns to its original position by no external forces, various structures and methods may be employed. For example, a slit 11, in which the movable piece 51 is supported to slide and move, may be formed obliquely. Alternatively, at least one of the movable piece 51 and the stationary piece 53 facing each other may be formed to have a stepped facing surface, and a torsional restoring force of an elastic body may be used to automatically return the movable piece 51. In this regard, more detailed descriptions will be made later.

As mentioned above, when external forces act on the movable piece 51 and the stationary piece 53, the movable piece 51 moves toward the middle of the body 50 (i.e. away from the stationary piece 53) and thus the facing distance (see 'g2' in FIG. 6) between the movable piece 51 and the stationary piece 53 becomes shorter to be narrower than the CD slot, so that the movable piece 51 and the stationary piece 53 can be easily inserted in the CD slot. Then, when a user removes the external forces, the movable piece 51 automatically returns toward the stationary piece 53 (i.e. close to the stationary piece 53) and thus the facing distance (see 'g1' in FIG. 5) between the movable piece 51 and the stationary piece 53 becomes longer, so that the movable piece 51 and the stationary piece 53 can be fitted to and stably and securely mounted to the CD slot.

In the foregoing portable device holder for vehicle CD-slot mounting according to an embodiment of the present invention, the movable piece 51 and the stationary piece 53 are arranged to face each other and the facing distance between them is variable by external forces, so that the movable piece 51 and the stationary piece 53 can be easily inserted in and stably mounted to the CD slot.

For such operations of the stationary piece 53 and the movable piece 51, the body 50 may be configured to have various shapes. For example, the body 50 has a structure where the movable piece 51 and the stationary piece 53 are arranged to face each other, and the facing distance between the movable piece 51 and the stationary piece 53 becomes shorter as the movable piece 51 moves in the lengthwise direction of the body 50 by external forces and longer as the movable piece 51 automatically returns its original position when the external forces are removed.

To this end, as shown in FIG. 2 to FIG. 13, the body 50 includes the stationary body 10 which is shaped like a hollow bar, and has the stationary piece 53 protruding from the outer circumference thereof and the slit 11 adjacent to the stationary piece 53 and formed along the lengthwise direction thereof; and a movable body 30 which is inserted in the hollow of the stationary body 10, and has the movable piece 51 protruding from the outer circumference thereof via the slit 11 so that the movable piece 51 can slide along the slit 11 when external forces act thereon and return to its original position by elasticity of an elastic body when the external forces are removed.

The stationary body 10 is generally shaped like a long hollow bar so that the movable body 30 inserted in and slide through the hollow. The stationary body 10 is divided into upper and lower parts to accommodate the movable body 30, and the upper and lower parts are assembled into the stationary body 10.

The stationary body 10 includes the stationary pieces 53 protruding from the outer circumference thereof. Specifically, the stationary pieces 53 are respectively formed protruding from both ends of the stationary body 10. Further, the stationary body 10 includes the slit 11 adjacent to the stationary piece 53 and formed in the longitudinal direction thereof. Specifically, the slits 11 are respectively adjacent to the stationary pieces 53 and formed long toward the middle of the stationary body 10. The slit 11 guides the protruding movable piece 51 to slide along the lengthwise direction of the stationary body 10.

As shown in FIG. 9, FIG. 10 and FIG. 12, the stationary body 10 includes a pair of support plates 13 facing each other in an inner middle portion thereof. Each support plate 13 serves to hold and support one end of the elastic body, e.g. a spring 31 of the movable body 30. The stationary body 10 further includes a coupling support boss in the inner middle portion between the pair of support plates 13. The coupling support boss refers to a part in which a screw is inserted and fastened when the upper and lower parts of the stationary body 10 are assembled.

In addition, the stationary body 10 includes coupling support bosses 15 at inner opposite portions thereof. For example, if the stationary body 10 is divided into the upper part and the lower part, the coupling support bosses 15 may protrude from an inner side of the upper part of the stationary body 10 as shown in FIG. 12. Each of the coupling support bosses 15 is used as a part in which a screw is inserted when the upper and lower parts of the stationary body 10 are assembled.

By the way, each coupling support boss 15 serves not only as a screw coupling part when the upper and lower parts of the stationary body 10 are assembled, but also to support the movable body 30 in order to prevent the movable body 30 from being separated from the inner side of the stationary body 10. In other words, each coupling support boss 15 protrudes from the inner side of the stationary body 10 so as to not only make it easy to couple the upper and lower parts of the stationary body 10 but also prevent the movable body 30 from separation.

The stationary body 10 includes the connecting portion 17 protruding from the circumference in the middle thereof. The connecting portion 17 protrudes from the outer circumference in the middle of the stationary body 10, and particularly protrudes from the circumference opposite to the circumference from which the stationary piece 53 protrudes. The connecting portion 17 may be formed with the insertion ball at the end thereof. The insertion ball may be inserted in and coupled to the first fastening portion 310 of the connection module 300, so that the connection module 300 can rotate at various angles to the connecting portion 17.

The movable body 30 is inserted in and coupled to an inner space, i.e. the hollow of the stationary body 10. Specifically, the movable bodies 30 form a pair and respectively inserted in and coupled to both sides of the stationary body 10. As shown in FIG. 9, FIG. 10 and FIG. 13, the movable piece 51 connects with the outer circumference of the movable body 10, protrudes through the slit 11 formed in the stationary body 10, and faces the stationary piece 53. Since the movable piece 51 protrudes through the slit 11, the movable piece 51 can slide in the lengthwise direction along the slit 11.

Each movable body 30 makes each movable piece 51 slide toward the middle when external forces act thereon and return to its original position when no external forces act thereon. That is, when the external forces acts on the movable body 30 (e.g. if a user presses each of the movable bodies 30 toward the middle), the movable piece 51 slides along the slit 11. On the other hand, when the external forces are removed, the movable piece 51 returns to its original position by the elasticity of the elastic body.

To this end, as shown in FIG. 9, FIG. 10 and FIG. 13, the movable body 30 includes the elastic body, i.e. the spring 31 inserted in the inner space of the stationary body 10, and a slider 33 coupled to a second end of the spring 31. That is, the spring 31 and the slider 33 are inserted in each of both sides in the inner space of the stationary body 10.

Each spring 31 is inserted in and coupled to the hollow of the stationary body 10 as its first end is supported on and held by the support plate 13 of the stationary body 10. Further, the second end of each spring 31 is coupled to the first side of the slider 33. Likewise, the first side of each slider 33 is inserted in and coupled to the second end of the corresponding spring 31.

The movable piece 51 is coupled to the outer circumference of the slider 33, and protrudes through the slit 11 of the stationary body 10 as it is coupled to the outer circumference of the slider 33. The movable piece 51 protruding through the slit 11 is formed to face the stationary piece 53 coupled to the stationary body 10. When external forces act on, i.e. when a user presses the second sides of both sliders 33, the movable piece 51 moves toward the middle while being guided by the slit 11.

The first side of the slider 33 is coupled to the spring 31, and the second side of the slider 33 is exposed to the outside in the stationary body 10. By the way, the elasticity of the spring 31 or the external forces urge the slider 33 to be separated from the inner space of the stationary body 10. To prevent the slider 33 from the separation, the slider 33 includes a guide hole 35 through which the coupling support boss 15 protruding in the inner space of the stationary body 10 passes.

Specifically, each slider 33 is formed with the guide hole 35 shaped like an elongated hole. Thus, the coupling support boss 15 protruding in the inner space of the stationary body 10 passes through the guide hole 35, and serves as a stopper for the slider 33 (see FIG. 9). Accordingly, the slider 33 is not separated even when its second side is pulled out or by the elasticity of the spring 31.

With this structure, if a user presses (i.e. external forces act on) the second side of each slider 33 of the movable bodies 30 inserted in and coupled to both sides of the stationary body 10, the spring 31 is compressed and the movable piece 51 coupled to the slider 33 is guided by the slit 11 to move toward the middle. As the movable piece 51 moves along the slit 11, the facing distance between the movable piece 51 and the stationary piece 53 becomes shorter (see FIG. 6). At this time, the facing distance g2 between the movable piece 51 and the stationary piece 53 is smaller than the CD slot, and therefore both the movable piece 51 and the stationary piece 53 can be inserted together in the CD slot.

There, if a user releases (i.e. no external forces act on) the second side of each slider 33, each slider 33 moves outward by the elasticity of each spring 31 and thus returns to its original position. At this time, the facing distance g1 between the movable piece 51 and the stationary piece 53 becomes longer (see FIG. 5). In result, the facing distance between the stationary piece 53 and the movable piece 51 increases while being inserted in the CD slot, so that the movable piece 51 and the stationary piece 53 can be in close-contact with the CD slot while being inserted in the CD slot, thereby more stably and securely keeping the mounting state.

As described above, if a user makes a press to move the movable piece 51 toward the middle along the slit 11, the facing distance between the movable piece 51 and the stationary piece 53 becomes shorter than that before making the press. In result, it is easy to insert the movable piece and the stationary piece in the CD slot. Then, if the movable piece 51 returns to its original position by the elasticity of the spring as the external forces are removed, the facing distance becomes longer, and therefore the movable piece 51 and the stationary piece 53 can be in close-contact with and mounted to the CD slot.

There may be various structures and methods of decreasing the facing distance between the movable piece 51 and the stationary piece 53 as the movable piece 51 moves. For example, the slit 11 may be not horizontally but obliquely formed along the lengthwise direction of the stationary body 10. In this case, the movable piece 51 slides obliquely along the slit 11 and moves toward the middle when external forces act thereon, thereby decreasing the facing distance between the movable piece 51 and the stationary piece 53. On the other hand, the movable piece 51 slides obliquely along the slit and returns its original position when the external forces are removed, thereby increasing the facing distance between the movable piece 51 and the stationary piece 53.

Alternatively, at least one of the movable piece 51 and the stationary piece 53 may have a stepped surface facing the other one. For example, as shown in FIG. 8, FIG. 10 and FIG. 13, one surface, which faces the stationary piece 53, between both surfaces of the movable piece 51 includes a movable high portion 51', and a movable low portion 51" lower than the movable high portion 51', and the movable high portion 51' is adjacent to the slit 11.

The movable high portion 51' of the movable piece 51 is being in contact with the stationary piece 53 while no external forces act thereon. At this time, the slider 33 connecting with the movable piece 51 is kept rotated in one direction in connection with the movable high portion 51' of the movable piece 51, and thus the spring 31 coupled to the slider is kept twisted.

With this structure, if a user presses the slider 33, the movable piece 51 moves toward the middle of the stationary body 10 along the slit 11. At this time, the movable high portion 51' of the movable piece 51 deviates from the stationary piece 53, and thus the stationary piece 53 faces the movable low portion 51" of the movable piece 51. As the slider 33 moves, the torsional restoring force of the spring causes the movable piece 51 to get closer to the facing surface of the stationary piece 53. In result, the facing distance between the movable piece and the stationary piece becomes shorter.

Regardless of the torsional restoring force of the spring, the stationary piece 53 faces the movable low portion 51" of the movable piece 51 when external forces act thereon. At this time, if a user presses the movable piece 51 toward the stationary piece 53, the stationary piece 53 and the movable low portion 51" of the movable piece 51 gets closer to each other. Therefore, the facing distance between the movable piece and the stationary piece becomes shorter.

Separately from the movable piece 51, the stationary piece 53 may also have a stepped shape. As shown in FIG. 11, the stationary piece 53 may include a stationary high portion 53' and a stationary low portion 53". At this time, the stationary low portion 53" is adjacent to the slit 11.

Since the movable high portion 51' of the movable piece 51 is adjacent to the slit 11, the stationary low portion 53" of the stationary piece 53 is adjacent to the slit 11. With this, the facing distance between the movable piece and the stationary piece is varied depending on movement of the movable piece.

As described above, the portable device holder according to an embodiment of the present invention can be easily inserted in and mounted to a vehicle CD slot and keep its mounting state stably and securely.

Further, the portable device holder according to an embodiment of the present invention can be mounted to CD slots of various sizes and be thus improved in universality.

Although a few exemplary embodiments of the present invention have been shown and described, these are for illustrative purpose only and it will be appreciated by those skilled in the art that changes may be made in these embodiments without departing from the principles and spirit of the invention, the scope of which is defined in the appended claims and their equivalents.

What is claimed is:

1. A portable device holder for vehicle compact disc (CD)-slot mounting, comprising a mounting module which comprises a movable piece and a stationary piece facing each other to be inserted in and mounted to a CD slot of a vehicle; a cradle on which a portable device is rest and held; and a connection module which connects the mounting module and the cradle,
    wherein the mounting module comprises a body shaped like a bar connected to the connection module, and the movable piece and the stationary piece protruding from an outer circumference of the body,
    wherein the movable piece is movable in a lengthwise direction of the body when external forces acts thereon and returns to its original position when the external forces are removed,
    wherein a facing distance between the movable piece and the stationary piece of when the external forces act thereon is shorter than the facing distance between the movable piece and the stationary piece of when no external forces act thereon.

2. The portable device holder for vehicle CD-slot mounting according to claim 1, wherein the body comprises
    a stationary body which is shaped like a hollow bar and comprises the stationary piece protruding from an outer circumference thereof, and a slit adjacent to the stationary piece and formed in a lengthwise direction; and
    a movable body which is inserted in and coupled to a hollow of the stationary body and connects with the movable piece protruding from an outer circumference thereof through the slit so that the movable piece can slide along the slit when external forces act thereon and return to the original position by elasticity of an elastic body when the external forces are removed.

3. The portable device holder for vehicle CD-slot mounting according to claim 2, wherein a surface, which faces the stationary piece, between both surfaces of the movable piece comprises a movable high portion, and a movable low portion lower than the movable high portion, and the movable high portion is adjacent to the slit.

\* \* \* \* \*